Feb. 2, 1926.
A. F. ERICKSON
1,571,400
THERMOSTATIC OVEN REGULATOR
Filed Dec. 1, 1922
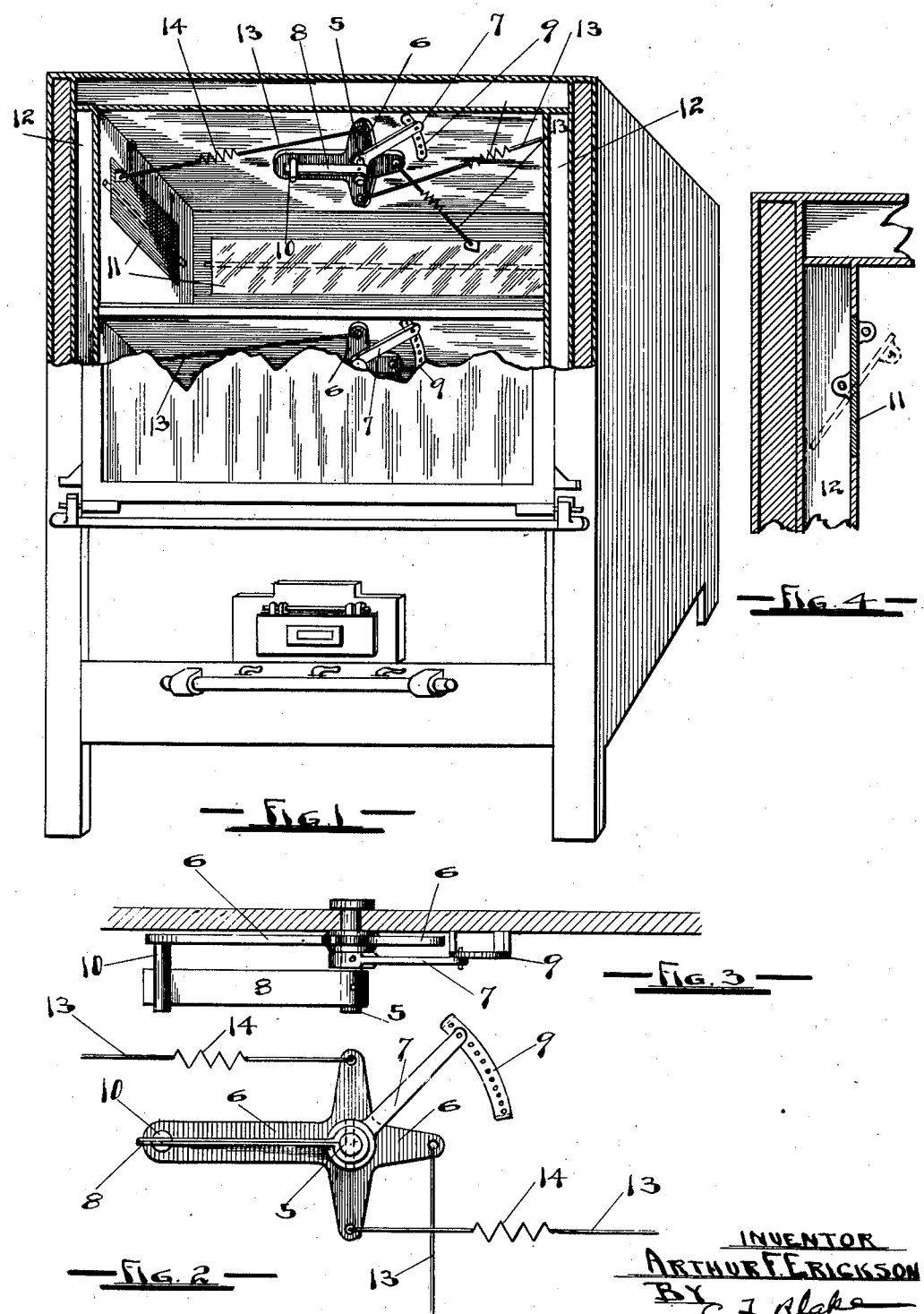
INVENTOR
ARTHUR F. ERICKSON
BY C. F. Blake
ATTY.

Patented Feb. 2, 1926.

1,571,400

UNITED STATES PATENT OFFICE.

ARTHUR F. ERICKSON, OF PORTLAND, OREGON.

THERMOSTATIC OVEN REGULATOR.

Application filed December 1, 1922. Serial No. 604,326.

*To all whom it may concern:*

Be it known that I, ARTHUR F. ERICKSON, a citizen of the United States, residing at Portland, county of Multnomah, State of Oregon, have invented certain new and useful Improvements in Thermostatic Oven Regulators, of which the following is a specification.

My invention relates to thermostatic oven regulators in general, and particularly to such regulators as are adaptable to gas heated ovens, and is so illustrated in the accompanying drawing.

The object of my invention is to provide a simple and positive device for regulating and controlling the temperature of each oven, or oven compartment, independently of all other such oven compartments, and without the attendance of an operator. A further object of my invention is to provide means in such a device of adjusting the thermostatic unit relatively to the operating parts of the device so as to compensate for irregularities of the working parts.

I accomplish these objects by means of the construction illustrated in the accompanying drawing, which is a part of this application for Letters Patent, like characters of reference indicating like parts throughout the several views thereof, and in which:

Fig. 1 is a perspective view of a gas oven with my device installed therein, parts being broken away to best illustrate my invention; Fig. 2 is a lower plan view of the working parts of my device; Fig. 3 is a side elevation of the subject matter of Fig. 2; and Fig. 4 is an enlarged fragmentary sectional view illustrating the dampers of the oven.

In general my device consists of a rotary pin upon which is secured a thermostatic unit and an adjusting arm, the latter being secured in any desired position by means of a coacting quadrant, a member freely mounted upon said pin and connected with said thermostatic unit, dampers in the walls of the oven, and members connecting each damper with said freely mounted member.

My device is mounted within each oven or oven compartment upon a pin 5 which pin is rotatably mounted in the top of said oven or oven compartment. A member 6 is freely mounted upon said pin 5 adjacent the oven top, and is conveniently provided with several arms as shown in the drawing. A regulating lever 7 is secured to the pin 5, conveniently pinned thereto as shown in Figs. 2 and 3, and a thermostatic unit 8 is also mounted upon the pin 5 adjacent the regulating lever 7, and is secured to said pin, conveniently pinned thereto as also shown in Figs. 2 and 3.

The pin 5 is prevented from rotating by the regulating lever 7 coacting with a suitable quadrant 9, which quadrant is mounted upon the oven top. The free end of the thermostatic unit 8 is connected with the freely mounted member 6 by means of a pin 10 integral with the said freely mounted member and provided with a slot therein to receive the thermostatic unit, as shown in detail in Figs. 2 and 3.

Butterfly type of dampers 11 are provided in the side and rear walls of the oven or oven compartment to control the passage of heated air from the flues 12 into the oven compartment, and each of said dampers are connected to the freely mounted member 6 by rods 13.

In order that the operation of the thermostatically operated details may not be interfered with should any one of the dampers 11 stick, I provide in each of said rods a longitudinally yieldable portion 14 of sufficient rigidity to operate the respective damper ordinarily in answer to the movement of the thermostatic unit, but to allow operation of said thermostatic unit, and thus of the other dampers, should any one of the dampers stick.

It is obvious that any deflection of the thermostatic unit, which is secured to the pin 5 will cause partial rotation of the freely mounted member 6 upon said pin, and thus, through the agency of the connecting rods 13, will cause the opening or closing of the dampers 11, according as the temperature within the oven compartment falls or rises respectively.

To compensate for any irregularities of manufacture either of the thermostatic unit or of the dampers or operating details of my device, the tension in the thermostatic unit may be varied by means of the regulating lever 7, which, being moved upon the quadrant 9 will cause a partial rotation of the pin 5 and the thermostatic unit 8 independently of the freely mounted member 6 and the dampers connected thereto. Furthermore, by a more extended movement of the regulating lever 7 upon the quadrant 9 the entire device, including the freely mounted member 6 may be partially rotated upon the pin 5, thus providing a means of determining the initial setting of the connected dampers 11 to hold an approximate temperature within the oven compartment, after which the thermostatic unit will operate to hold said temperature exact, by opening or closing the dampers slightly as required.

My device may be made of any size, and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In an oven: a plurality of dampers; a rotatable pin; a member freely mounted upon said pin; yieldable connecting rods connecting each of said dampers with said member; a lever secured to said pin; a quadrant coacting with said lever; a thermostatic unit secured upon said pin; and means to connect the free end of said thermostatic unit with said member.

2. In an oven; a themostatic member and a regulating lever mounted so they may rotate in unison; a freely rotatable member operated by said thermostatic unit; dampers; and yieldable connecting rods between said dampers and said member.

In witness whereof I claim the foregoing as my own I hereunto affix my signature at Portland, county of Multnomah, State of Oregon, this 22 day of Nov. 1922.

ARTHUR F. ERICKSON.